D. APPLEGATE.
ICE HARVESTING MACHINE.
APPLICATION FILED NOV. 18, 1918.
1,351,604.
Patented Aug. 31, 1920.
4 SHEETS—SHEET 1.
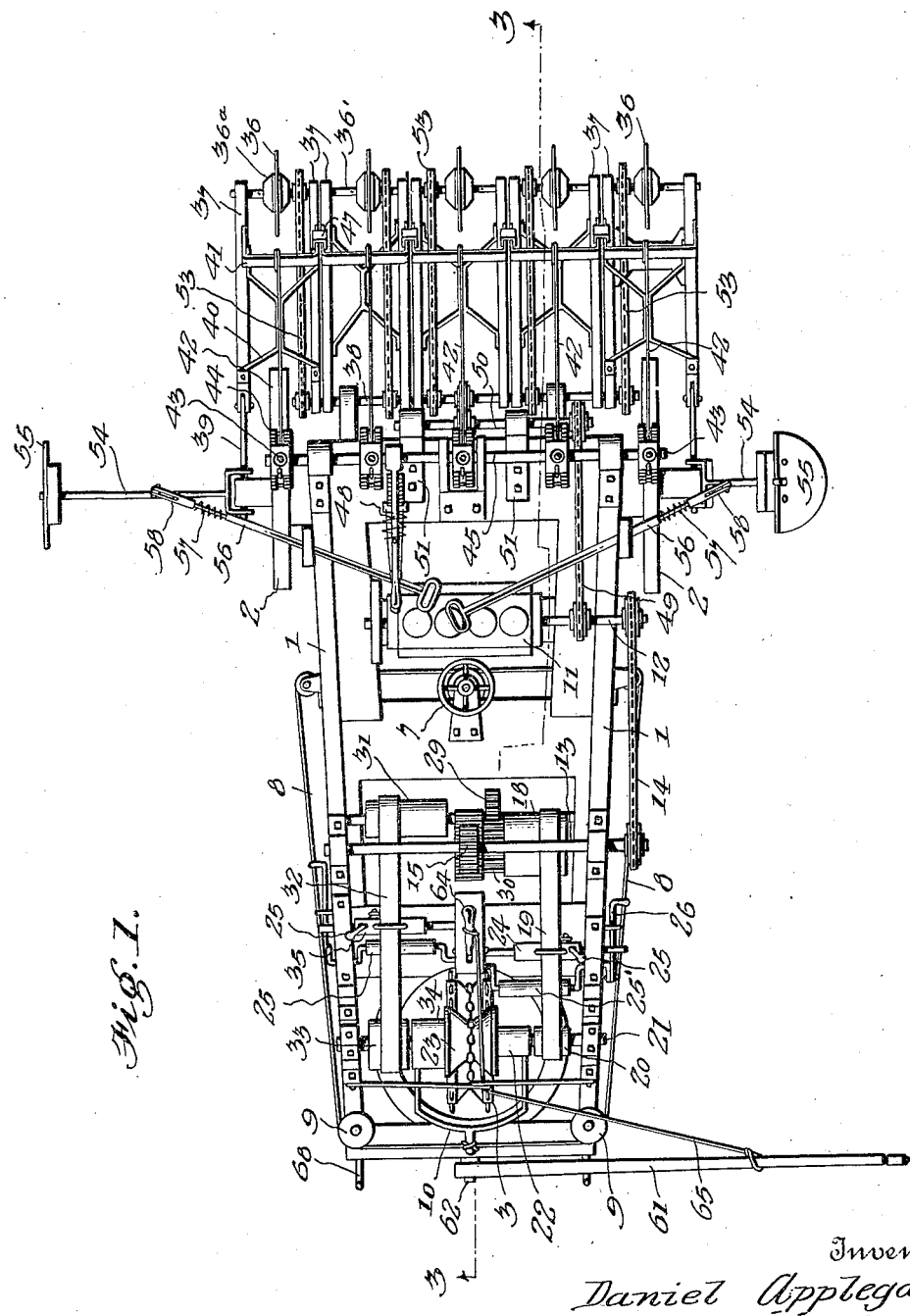
Fig. I.
Inventor
Daniel Applegate
By Robb & Robb
Attorneys

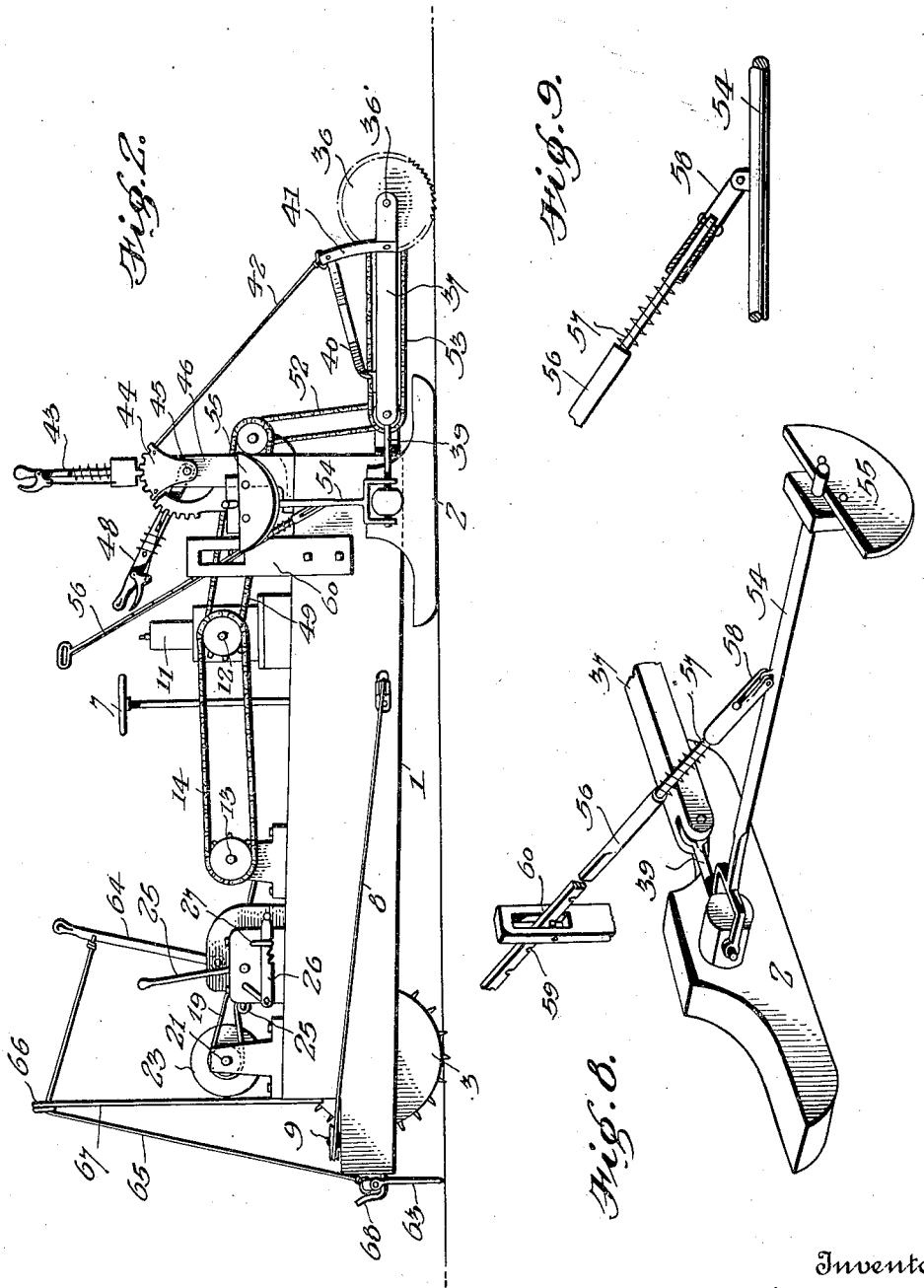

D. APPLEGATE.
ICE HARVESTING MACHINE.
APPLICATION FILED NOV. 18, 1918.
1,351,604.
Patented Aug. 31, 1920.
4 SHEETS—SHEET 3.
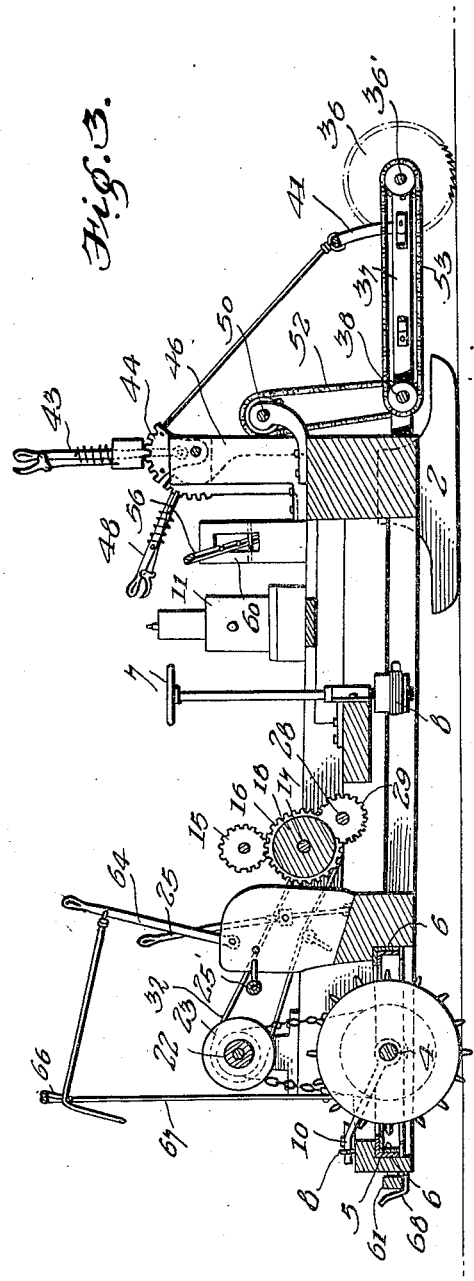
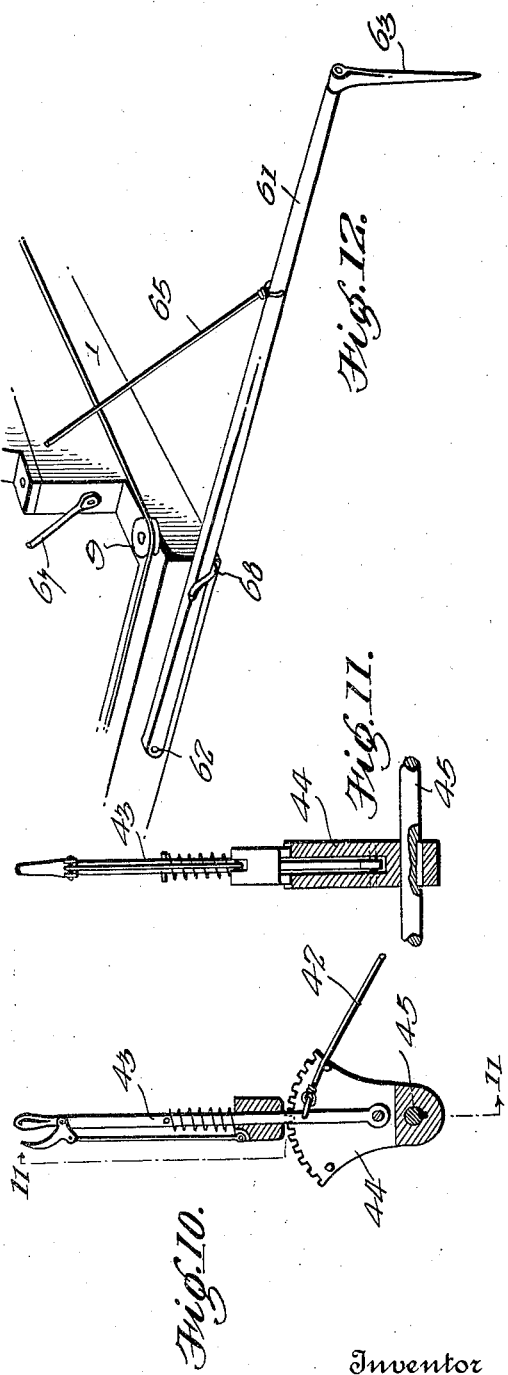
Inventor
Daniel Applegate
By Robb & Robb
Attorneys D. APPLEGATE.
ICE HARVESTING MACHINE.
APPLICATION FILED NOV. 18, 1918.
1,351,604.
Patented Aug. 31, 1920.
4 SHEETS—SHEET 4.
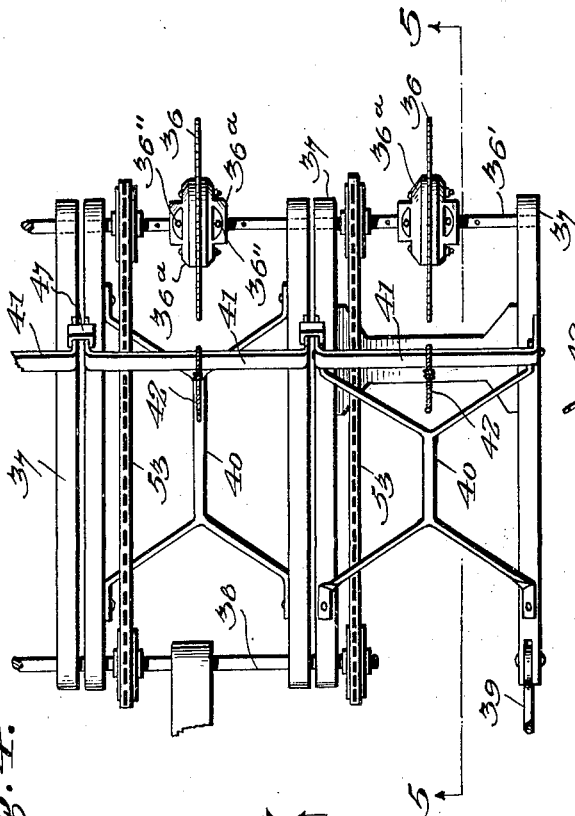
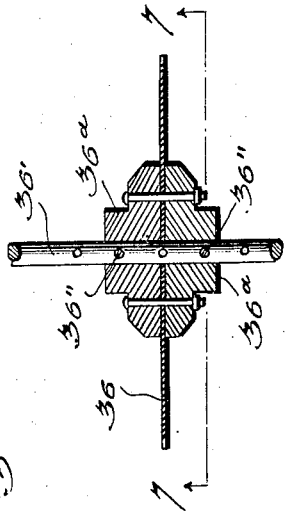
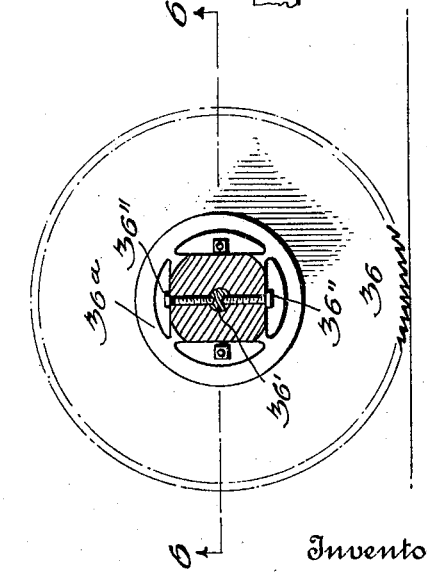
Inventor
Daniel Applegate
By Robb & Robb
Attorneys

UNITED STATES PATENT OFFICE.

DANIEL APPLEGATE, OF PORT CLINTON, OHIO.

ICE-HARVESTING MACHINE.

1,351,604.  Specification of Letters Patent.  Patented Aug. 31, 1920.

Application filed November 18, 1918. Serial No. 262,999.

*To all whom it may concern:*

Be it known that I, DANIEL APPLEGATE, a citizen of the United States, residing at Port Clinton, in the county of Ottawa and State of Ohio, have invented certain new and useful Improvements in Ice-Harvesting Machines, of which the following is a specification.

The present invention relates to improvements in ice harvesting apparatus and it has for its object to provide a suitable vehicular machine of this type capable of movement over the field of ice and of sawing the ice during the movement into blocks of convenient size and shape.

The primary feature of my invention by means of which this object is carried out lies in the arrangement of the gang of saws, such that the operator may readily control the cutting of the ice blocks into the desired size, this end being accomplished by providing means for adjusting the saws either independently or as a whole to render them operative or inoperative, as the case may be, for cutting purposes.

In addition to the foregoing, my invention comprehends novel driving mechanism for moving the apparatus.

These and such other objects as may hereinafter appear are attained by the novel construction, combination and arrangement of parts to be hereinafter specifically described and claimed. Reference will now be made to the accompaying drawings forming a part of this specification wherein:

Figure 1 is a top plan view of a machine constructed in accordance with this invention.

Fig. 2 is a side elevation thereof.

Fig. 3 is a longitudinal sectional view taken about at the plane indicated by the line 3—3 of Fig. 1.

Fig. 4 is an enlarged view of a portion of the ice saws and their frames.

Fig. 5 is a sectional view on the line 5—5 of Fig. 4.

Fig. 6 is a sectional view on the line 6—6 of Fig. 7.

Fig. 7 is a sectional view on the line 7—7 of Fig. 6.

Fig. 8 is a perspective view of one of the runners of the vehicle showing attached adjacent thereto a guide and anti-skidding member.

Fig. 9 is a fragmentary sectional view showing the more clearly the tension means for the guide just referred to.

Fig. 10 is a sectional view through one of the adjustment levers for the saws.

Fig. 11 is a sectional view on the line 11—11 of Fig. 10; and Fig. 12 is the fragmentary perspective of the forward portion of the vehicle frame showing the front marker in operative position.

Throughout the following detail description and on the several figures of the drawings, similar parts are referred to by like reference characters.

Referring to the drawings and specifically describing the invention 1 designates the main frame of the vehicle which at its rear end is supported upon the ice runners 2 which are pivotally mounted upon said frame. At the forward portion the frame is supported upon the spiked wheel 3 by means of which traction is afforded for moving the vehicle over the surface of the ice. This wheel is carried by the axis 4 which in turn is mounted in an annular frame 5 rotatable about a vertical axis in the channel 6. The wheel is shifted for guiding purposes by the operator through the instrumentality of the steering wheel 7 located at a convenient point upon the frame, said wheel being operatively connected to the axis 4 of the wheel 3 by flexible cables 8 passing around pulleys 9 on the forward extremity of the frame 1, each cable being secured to the yoke 10 which is directly connected to the axis of the wheel aforesaid.

At 11 is indicated a suitable prime mover or engine for driving the vehicle as well as imparting operation to the cutting instrumentalities hereinafter referred to. Motion is transmitted from the engine shaft 12 to the transverse shaft 13 by the chain 14, said shaft 13 carrying at a central point the pinion 15 which meshes with a driving gear 16 upon the shaft 17. This shaft carries a belt pulley 18 by means of which motion is imparted through the belt 19 to the idler 20 on the forward drive shaft 21. Said shaft carries a fixed pulley adjacent to the idler as indicated at 22 and at a central point a grooved drum 23 fixed to said shaft. About the said drum a straight linked chain passes and also around the spiked traction wheel 3 which is likewise grooved to receive this chain. By reason of the fact that the drum 23 is mounted in the vertical axis of the drive wheel 3 the rotation of said wheel about the axis for guiding purposes is possible. At one side of the frame I arrange the belt shifter 24 having the lever 25 attached thereto by means of which lateral movement may be imparted to the belt to shift the same from the idler 20 to the pulley 22 to thereby impart forward movement to the vehicle. Beneath the belt 19 is mounted a tightener 25', the crank arm of which extends through the side of the frame 1 and is connected to the adjusting bar 26 which is notched to engage with the stop 27 as most clearly seen in Fig. 2, for the purpose of holding the tightener at adjusted position.

Beneath the shaft 17 carrying the drive gear 16 is the third shaft 28 which has mounted thereupon a gear 29 meshing with a gear 30 upon the said shaft 17 at one side of the gear 16 above mentioned. Thus the lowermost shaft 28 receives its motion from the shaft 17 and as the former shaft carries the pulley 31 such motion is transmitted through the belt 32 to the idler 33 on the forward drive shaft 21 and opposite the side of the drum 23 from that carrying the idler 20. This forward shaft likewise carries the fixed pulley 34 on this side and when the belt 32 is shifted by the belt shifter 35, similar in construction and adjustment to the shifter 24, on to fixed pulley 34, movement will be imparted to the traction wheel 3 in the reverse direction. It thus follows that by this arrangement forward or reverse drive is imparted to the harvesting machine.

Passing now to a description of the cutting instrumentalities, it will be noted that at the rear end of the vehicle frame 1 is mounted a gang of saws 36. Each saw is mounted between side pieces 37 constituting a convenient frame support for its saw, said side pieces being generally pivotally mounted upon the shaft 38 attached to the rear of the frame 1, excepting only the outermost side pieces 37 at each side which are suitably swung upon bracket arms 39. The side members of the individual saw frames are suitably braced as indicated at 40 and provided with a cross bar 41 to which is connected one end of a flexible connection 42. The other end of said connection is attached to an adjustment lever 43 which in turn is pivotally mounted upon the segment piece 44 having fixed connection with a transverse shaft 45 journaled upon the vertical standards 46 at the rear end of the frame 1. It will be observed that each one of the individual saw frames is provided with such adjustment lever 43 and obviously any one of the frames may be raised or lowered by means of this lever at the will of the operator. I preferably connect the individual saw frames together by clips 47 which tend to hold the frames in their proper relative positions while permitting movement of any one with relation to its contiguous frame. As stated the individual adjustment of the saws is accomplished by the adjustment of a lever 43 but I secure a main adjustment, so-called for purposes of distinction, by means of the main adjustment lever 48 which has fixed connection with the shaft 45. Obviously the adjustment of this lever 48 will impart an up and down movement to the saw frames as a whole through the connections 42 from the adjustment levers 43 to the saw frames.

The saws are actuated from the motor 11 through the chain drive 49 from the shaft 12 to the shaft 50 mounted in the brackets 51 at the rear of the machine and from said shaft to the lower shaft 38 by the chain 52. This shaft 38 as above indicated is the pivotal axis of the saw frames and is the common drive for each of the saws which are individually driven from said shaft by their own chain drive 53.

At each side of the vehicle is pivotally mounted a laterally extending arm 54 which carries at its outer end a disk or similar element 55 which constitutes a guide for the machine, or more strictly speaking this member prevents side slipping of the rear portion of the machine by virtue of its engagement in a saw groove previously made by one of the saws in movement of the machine over the ice. Each of these arms 54 is adjusted to operative or inoperative position by the lever 56 which extends upwardly at an incline to a point convenient for access by the operator. As will be observed in Figs. 8 and 9 each arm is provided with tension spring 57, the lowermost end of the member 54 having sliding connection with the connector piece 58 attached to the arm 54. In this manner the proper pressure may be exerted upon the guide and such adjustment maintained by engagement of the proper notch 59 in the lever 56 with the catch or holding part 60. At the forward portion of the machine I mount a further guide or marker which consists of the arm 61 pivoted at 62 so as to swing to either side of the frame so as to extend laterally therefrom. The outer end of the arm carries a pendent guide 63 which is designed to operate along a saw cut previously made so as to assist the operator in the direction of the apparatus. This arm is shifted from one side to the other by means of the lever 64 and flexible connection 65 which passes through a guide loop 66 in a suitable frame 67 attached to the front of the machine. In other words, when it is desired to shift this arm the operator moves the lever 64 rearward quickly which throws the arm 61 about its pivot to the opposite side of the frame. In either position said arm is supported at an intermediate point by a bracket 68.

It may be added at this point that each of the saws 36 excepting preferably the central one, is adjustably mounted upon its shaft 36'. This will be noted in Figs. 6 and 7 inasmuch as said shaft is provided with suitable recesses to receive the set screws 36'' which are mounted in clamping disks 36ª at either side of the saw. To obtain a wider cut block or a narrower cut block requires simply the adjustment of these saws toward or from the central saw in an obvious manner.

The operation of this apparatus will probably be clear to those skilled in the art to which the invention refers from the foregoing description. It may be stated, however, that the particular advantage of the mechanism lies in the control of the saw or cutting instrumentalities so that the proper size cakes of ice may be cut. In other words, all of the saws may be lowered into cutting position in respect to the ice when the machine moves in one direction over the field and when cross cutting certain of said saws may be lifted out of cutting position so that the size of the cake of ice would be obviously rectangular. Under the conditions, it will be apparent, that if the gang of saws is adjusted by the main adjustment lever 48 to such position as to be out of contact with the surface of the ice all of the saws are inoperative so far as the cutting function is concerned, though all of the saws are continuously driven. The operator may under such condition lower any one or more of said saws into contact with the surface of the ice for cutting purposes. Again, if all of the saws have been adjusted by the main adjustment lever 48 into ice contact position, the lowermost position, the operator may likewise adjust any one or more of the saws into inoperative position by the individual adjustment levers 43. This wide range of adjustment is extremely convenient because as will be understood the operative or inoperative position for the individual saws may be obtained regardless of the position of the gang of saws as a whole.

By virtue of the fast and slow movement of the belts the machine is capable of being moved forwardly and rearwardly as found necessary and the whole apparatus forms a very simple harvesting machine for the purpose indicated.

It will be apparent that changes may readily be made in the details of construction without departing from the spirit of the invention and within the scope of the appended claims.

Having thus described my invention, what I claim as new is:

1. In an ice harvesting machine of the class described, a frame adapted to move over the ice to be cut, ice saws swingingly mounted on said frame, a series of levers corresponding to the saws for raising or lowering each of the same independently of one another, a shaft common to said levers and mounted on the frame, and means for actuating said shaft to thereby shift the saws through the said levers regardless of the position of any one of the same.

2. In an ice harvesting machine of the class described, the combination of a vehicular frame, a plurality of saws, frame members pivotally connected to the vehicular frame and independently supporting the individual saws, means on each of said frames for actuating said saws, and means for adjusting the frames and the saws to and from operative positions, the same including independent adjusting levers mounted on the vehicular frame, a flexible connection between each lever and its saw frame, a cross bar to which said connection is attached, clip means attached to the cross bar and connecting the adjacent saw frames together while leaving them free to be adjusted independently, and a main adjusting lever adapted to adjust the saw frames conjointly regardless of the adjustment thereof by the individual levers.

In testimony whereof I affix my signature.

DANIEL APPLEGATE.